United States Patent
Saito et al.

[15] 3,655,936
[45] Apr. 11, 1972

[54] APPARATUS FOR ELECTROEROSIVELY ETCHING A WORKPIECE

[72] Inventors: Nagao Saito; Kazuhiko Kobayashi, both of Nagoya; Susumu Niwa, Komaki, all of Japan

[73] Assignee: Mitsubishi Denki Kabushiki Kaisha, Tokyo, Japan

[22] Filed: Jan. 25, 1971

[21] Appl. No.: 109,306

[30] Foreign Application Priority Data

Feb. 6, 1970  Japan..................................45/10536

[52] U.S. Cl..............................219/69 C, 219/69 P, 219/69 S
[51] Int. Cl...................................................B23p 1/08
[58] Field of Search.............................219/69 C, 69 P, 69 S

[56] References Cited

UNITED STATES PATENTS

| | | |
|---|---|---|
| 2,871,410 | 1/1959 | Matulaitis............................219/69 S |
| 3,052,817 | 9/1962 | Branker..............................219/69 C |
| 3,154,719 | 10/1964 | Sommeria...........................219/69 C |
| 3,154,721 | 10/1964 | Sommeria...........................219/69 C |
| 3,158,728 | 11/1964 | Webb.................................219/69 C |
| 3,485,987 | 12/1969 | Porterfield.........................219/69 P |
| 3,578,937 | 5/1971 | Sennowitz..........................219/69 P |

*Primary Examiner*—R. F. Staubly
*Attorney*—Oblon, Fisher & Spivak

[57] ABSTRACT

A circuit for an electroerosive etching apparatus is disclosed which includes first and second direct current sources controlled by first and second switching circuits, respectively. The first switching circuit includes a plurality of switching elements, all of which are connected in parallel to facilitate the delivery of large currents and a pulse source for controlling the switching elements. The second switching circuit may include only one switching element, and is designed to supply only small currents. In operation, the first and second switching circuits initially cooperate to apply a potential nearly equal to the combined potentials of the two direct current sources across a working gap. Once a discharge is achieved using this high potential, the second switching circuit is automatically cut off, leaving the first switching circuit operative to supply the large current needed in the etching operation. A protective circuit is also included to prevent damage of the first switching circuit due to overloading.

8 Claims, 4 Drawing Figures

Patented April 11, 1972

INVENTORS
NAGAO SAITO
KAZUHIKO KOBAYASHI
SUSUMU NIWA

BY Oblon, Fisher & Spivak

INVENTORS
NAGAO SAITO
KAZUHIKO KOBAYASHI
SUSUMU NIWA

BY

Oblon, Fisher and Spivak

3,655,936

APPARATUS FOR ELECTROEROSIVELY ETCHING A WORKPIECE

BACKGROUND OF THE INVENTION

1. Field Of The Invention

This invention relates to an electroerosive etching apparatus, and more particularly to an electroerosive etching apparatus which etches a workpiece by applying intermittent current pulses across a working gap formed between the workpiece and a working electrode.

2. Description Of Prior Art semiconductor

A conventional pulsed electroerosive etching apparatus generally includes a direct current source and a switching element connected in series across a working gap. The switching element converts the DC voltage of the direct current source to an intermittent pulse voltage which is applied across the working gap. The switching element generally includes a mechanical switch, or a semiconductor switch, such as a transistor.

In electroerosive etching apparatuses, the breakdown voltage of the switching element is of great importance, and has a significant influence upon the efficiency of the etching operation, since the peak value of the pulse voltage applied at the working gap is limited by the breakdown voltage of the switching element. Thus, when a switching element having a high breakdown voltage is used, the voltage of the DC source can be increased to increase the peak value of the working pulse voltage. When the peak value of the working pulse voltage is high, the working gap, which is the distance between the workpiece and the working electrode, can be sufficiently widened so that the working gap is not shortcircuited with the waste powder accumulated by etching operations. Thus, accidental stoppage of the etching operations may be prevented. On the other hand, when a switching element having a low breakdown voltage is used, a narrower working gap is required, causing frequent accidental shortcircuiting of the working gap on account of the accumulated waste powder of the etching operation. Naturally, every time such shortcircuiting occurs, it must be repaired by interrupting the etching operation, which decreases the overall efficiency of the operation.

Thus, in electrolytic etching apparatuses of the type described above, the use of switching means having a high breakdown voltage is potentially desirable. However, when a transistor is employed as the switching element, its breakdown voltage is generally low. In addition, the peak value of the pulse voltage is usually chosen as between ½ and ⅓ of the breakdown voltage (i.e., below 100 (V)) to include a safety factor, thereby further reducing the operating voltage. Of course, it is possible to increase the peak value of pulse voltage by using transistors of high breakdown voltage. However, such transistors are expensive, and do not have good high frequency switching characteristics and are limited to low output currents. The problem of low output currents can be remedied by using many transistors connected in parallel in order to develop the required output current, but such an arrangement makes the entire apparatus much more expensive.

SUMMARY OF THE INVENTION

Accordingly, one object of this invention is to provide an improved apparatus for electrolytically etching which is both efficient and inexpensive to manufacture.

Another object of the present invention is to provide an improved apparatus for electrolytically etching which permits the use of a relatively large working gap while employing switching elements of relatively low breakdown voltage.

Yet another object of the present invention is to provide an improved apparatus for electrolytically etching which includes a circuit for protecting against overloads.

Briefly, these and other objects of the invention are achieved by providing first and second direct current sources controlled by first and second switching circuits, respectively. The switching circuits cooperate to apply a voltage approximately equal to the combined potentials of the two direct current sources across a working gap. Once a discharge is achieved using this combined potential, the second switching circuit, which is designed to deliver only relatively small currents, is automatically cut off. The first switching circuit, which is designed to deliver large currents remains operative to accomplish the etching operation.

BRIEF DESCRIPTION OF THE DRAWINGS

Other objects, features and advantages of the present invention will become apparent from the following description taken in conjunction with the accompanying drawings, in which.

DETAILED DESCRIPTION OF PREFERRED EMBODIMENTS

Figure 1:
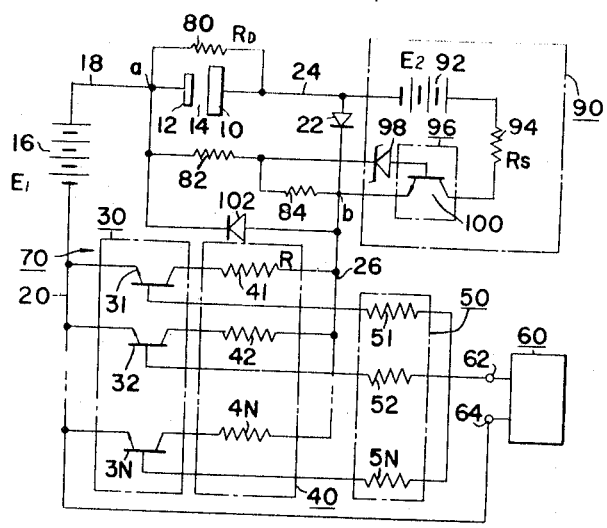
FIG. 1 is a schematic diagram of the circuit of one embodiment of the present invention.

Referring now to the drawings, particularly to FIG. 1 thereof, which shows a circuit in accordance with one embodiment of this invention, a workpiece 10 is fixed on the fitting table (not shown) of an electrolytic etching apparatus. This workpiece 10 is disposed within an etching bath (not shown), which is open at the top and filled with an insulating liquid, such as a conventional oil. A working electrode 12 is supported by an electrode holder (not shown) with one end immersed in the insulating liquid and positioned adjacent to workpiece 10 so as to form a working gap 14 filled with the insulating liquid. The holder may be connected to a conventional feed mechanism which moves the working electrode 12 toward the workpiece 10 in accordance with the progress of the etching. The numeral 16 designates a first direct current source, the anode of which is connected to the working electrode 12 by means of a lead wire 18. The numeral 20 designates a lead wire, one end of which is connected to the cathode of the direct current power source 16. The numeral 22 designates a diode, the anode of which is connected to the workpiece 10 by means of a lead wire 24. The numeral 26 also designates a lead wire, one end of which is connected to the cathode of the diode 22. A first switching apparatus 30 includes a plurality of transistors which may be of the NPN-type designated 31, 32 - - - - (3N). Each of these transistors has substantially the same rating and characteristics.

A resistance means 40 is illustrated as including a plurality of resistors 41, 42 - - - - (4N), each having the same resistance R. The number of these resistors 41, 42 - - - - (4N) is equal to the number of transistors employed in the first switching apparatus 30. Each of the emitter electrodes of the transistors 31, 32 - - - - (3N) is connected to the lead wire 20. The collector electrodes of the transistors are connected to lead wire 26 through resistors 41, 42 - - - - (4N), respectively. Thus, the emitter and collector circuits of transistors 31, 32 - - - - (3N) and the resistors 41, 42 - - - - (4N) are respectively connected in series with each other, constituting N series circuits between the lead wires 20 and 26. Each of the resistors 41, 42 - - - - (4N) acts to control the collector current of each of transistors 31, 32 - - - - (3N), respectively.

The numeral 50 designates a resistance means which comprises a plurality of resistors 51, 52 - - - - (5N) each having equal resistance. The number of resistors in resistance means 50 is equal to the number of transistors used in the first switching apparatus 30. One end of each of resistors 51, 52 - - - - (5N) is connected to the respective base electrodes of transistors 31, 32 - - - - (3N) by means of separate lead wires. The remaining ends of each of resistors 51, 52 - - - - (5N) are joined together and connected to a positive output terminal 62 of a pulse generating apparatus 60. A negative output terminal 64 of pulse generating apparatus 60 is connected through lead wire 20 to the emitters of transistors 31, 32 - - - - (3N). The pulse generating apparatus 60 may be of a conventional type which generates a pulse voltage periodically across the positive and negative output terminals 62 and 64. The resistors 51, 52 - - - - (5N) act to control electric current in the base electrodes of each transistors 31, 32 - - - - (3N) in accordance with the pulse voltage.

A circuit including the lead wires 18, 20, 24, and 26, the first direct current power source 16, the first switching means 30, the resistance means 40 and diode 22, constitutes a main circuit 70 with respect to the working gap 14.

The numeral 80 designates a resistor shunted across the working gap 14, one end of which is connected to lead wire 24 and the other end of which is connected to lead wire 18. The numerals 82 and 84 designate resistors which are disposed in series between the lead wires 18 and 26.

The numeral 90 designates an auxiliary circuit which performs an auxiliary function in conjunction with the main circuit 70, and includes a second direct current power source 92, a resistor 94, a second switching apparatus 96, and a constant-voltage element 98. The cathode of the second direct current power source 92 is connected to lead wire 24, and the anode of second source 92 is connected to resistor 94. The second switching means 96 includes a transistor 100, which may be of the NPN-type. The emitter electrode of transistor 100 is connected to lead wire 26, and its collector electrode is connected to resistor 94. The constant-voltage element 98, which may be a zener diode, is connected at its anode to the base electrode of transistor 100, and at its cathode to a mutual node of the resistors 82 and 84. The numeral 102 designates a diode, the anode of which is connected to the lead wire 26 and the cathode of which is connected to lead wire 18.

It is possible to set the voltage $E_1$ of the first direct current power source 16 and the voltage $E_2$ of the second direct current power source 92 at various values. However, it has been found advantageous to set $E_1$ within a range of 30 – 100 (V) and $E_2$ within a range of 50 – 350 (V). It is also possible to set the resistance R of the resistors 41, 42 - - - - (4N) and resistance $R_s$ of the resistor 94 at various values. For example, R and $R_s$ may both be below 200 ($\Omega$). In addition, the resistance $R_D$ of resistor 80 can be set at various values so long as the following relationship is met: $R_D >> R, R_s$. For example, $R_D$ may be in the range of from 500 – 1500 $\Omega$.

Figure 2:
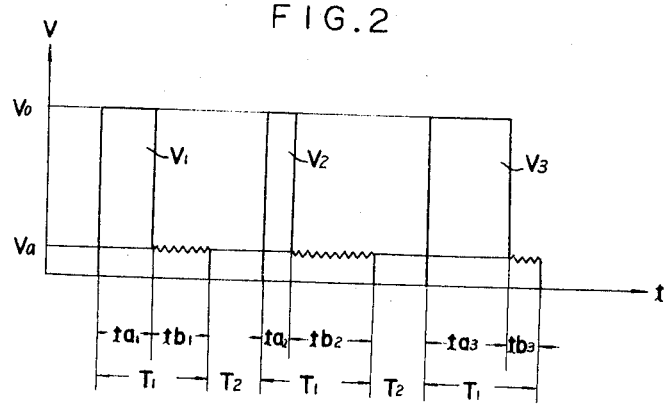
FIG. 2 is a graphical diagram of the voltage waveform in the working gap of the circuit shown in FIG. 1.

The operation of the apparatus described above will now be explained by reference to FIG. 2. FIG. 2 is a graphical plot in which time is displayed along the horizontal axis and voltage across the working gap 14 is displayed along the vertical axis. In FIG. 2, three successive voltage pulses, $V_1$, $V_2$, and $V_3$ which may be applied to the working gap 14 are illustrated. Each pulse $V_1$, $V_2$, $V_3$ has a total period $T_1$, which is divided into two sub-periods $t_a$ and $t_b$, the significance of which will be described in detail hereinafter. The three periods $T_1$ are equal, as are the quiescent periods $T_2$ separating them.

The durations of the periods $T_1$ and the associated quiescent periods $T_2$ are determined by the output pulses of pulse generating apparatus 60. When an output pulse is generated, a base current flows from the base electrode to the emitter electrode of each of transistors 31, 32 - - - - (3N) through the various resistors of resistor means 50, and all transistors 31, 32 - - - - (3N) are switched on. The "on" period of transistors 31, 32 - - - - (3N) is equal to the period $T_1$, and it is determined by the duration of the output pulse from pulse generating apparatus 60. When the output pulse of the pulse generating apparatus 60 terminates, each transistors 31, 32 - - - - (3N) is switched off. The duration of the "off" or open-circuit interval is equal to the quiescent period $T_2$, and it is determined by the period between output pulses of pulse generating apparatus 60. The duration $T_1$ and quiescent time $T_2$ can be altered by changing the pulse duration and separation times of pulse generating apparatus 60.

The period $T_1$ of voltage pulses $V_1$, $V_2$ and $V_3$ will now be discussed in detail. The three voltage pulses $V_1$, $V_2$ and $V_3$ shown in FIG. 2 include a sub-period $t_a$ during which an electrical discharge does not appear in the working gap 14, and another sub-period $t_b$ in which an electrical discharge is generated in the working gap 14. It will be observed that sub-periods $t_{a1}$ and $t_{b1}$ correspond to $V_1$, while $t_{a2}$ and $t_{b2}$ correspond to $V_2$, and $t_{a3}$ and $t_{b3}$ correspond to $V_3$.

The sub-periods $t_a$ and $t_b$ are determined by conditions in working gap 14. In some cases, one of the sub-periods $t_a$ or $t_b$ can be zero. When sub-period $t_a$ is zero, $T_1 = t_b$ and an electrical discharge is generated in the working gap 14 during the entire period $T_1$. When sub-period $t_b$ is zero, $T_1 = t_a$ and no electrical discharge is produced at all in the working gap 14. According to the situation in the working gap, particularly the dielectric breakdown voltage of the working gap, even though one of the sub-periods $t_a$ and $t_b$ may be zero in some cases, the typical pulse voltage waveforms are shown in FIG. 2 as including both sub-periods $t_a$ and $t_b$. In any event, the relation between the sub-periods $t_a$ and $t_b$ and the period $T_1$ may be represented by the following equation:

$$T_1 = t_a + t_b \qquad (A)$$

Firstly, the operation of the apparatus during sub-period $t_a$ will be discussed in detail. In the sub-period $t_a$, the voltage of the working gap 14 is Vo as shown in FIG. 2. The voltage Vo is usually referred to as the no-load voltage. At the beginning of sub-period $t_a$, the apparatus shown in FIG. 1 enters its first operating state. This first operating state begins immediately after each of the transistors of the first switching apparatus 30 is switched on. In the first operating state, the voltage $E_1$ of the first direct current power source appears across resistor 80. As stated above, the resistance $R_D$ of resistor 80 is such that $R_D >> R$ where R is the resistance value of the resistors in resistor means 40. Thus, almost all the voltage $E_1$ is initially applied across the working gap 14.

The voltage $E_1$ of the first direct current power source 16 is impressed across the working gap 14, making the diode 22 conductive. That is, diode 22 is forward biased and is in a conductive condition having a remaining voltage drop of only about 1 (V). In this state, virtually the entire voltage $E_1$ appears across the node $a$ of resistor 82 and lead wire 18, and the node $b$ of resistor 84 and lead wire 26. Thus, in the first operating state, the voltage $Eab_1$ between the nodes $a$ and $b$, amounts to the sum of the voltage drops across resistor 80 and across diode 22. This voltage $Eab_1$ is divided by resistors 82 and 84.

In the situation described above, the voltage across resistor 84 makes the zener diode 98 conductive. Thus, the resistance of resistors 82 and 84 must be selected so that the voltage across resistor 84 is higher than the zener voltage of the zener diode 98 to forward bias the base and the emitter electrodes of transistor 100. Transistor 100 is then switched to its conductive state by receiving base current through the zener diode 98.

Immediately after the transistor 100 is switched on, diode 22 is reverse biased, and the circuit is switched to its second operating state. In the second operating state, the auxiliary circuit 90 is operative to apply a voltage across the working gap 14 which is nearly equal to the sum of the voltages $E_1$ and $E_2$ associated with the first and second direct current sources 16 and 92, respectively.

The second operating state will now be described in detail. The second operating state can best be understood in terms of current flow through the circuit. Therefore, a first current $i_1$ is defined as the current flowing through a first network which includes diode 22, resistor means 40, first switching means 30, first direct current source 16 and resistor 80. A second current $i_2$ is defined as the current flowing through a second network which includes second direct current source 92, resistor 94, the collector and emitter electrodes of transistor 100 and diode 22.

If the voltage across diode 22 is defined as $E_D$, the following formula is obtained:

$$i_1 R_D + i_1 \times R/N = E_1 - E_D \qquad (B)$$

In this formula, the voltage drop in the power source 16 and the switching means 30 are disregarded.

With respect to the second circuit current, $i_2$, the following formula is obtained:

$$i_2 R_s = E_2 + E_D \quad \text{(C)}$$

Also, the following formula is obtained because current $i_2$ does not become greater than current $i_1$ due to the existence of diode 22:

$$i_1 \geq i_2 \quad \text{(D)}$$

But, $i_1$ and $i_2$ are obtained from equations (B) and (C) above:

$$i_1 = \frac{E_1 - E_D}{R_d + \frac{R}{N}} \doteq \frac{E - E_D}{R_D} \quad \text{(E)}$$

$$(\because R_D \gg R)$$

$$i_2 = \frac{E_2 + E_D}{R_s} \quad \text{(F)}$$

The equations (E) and (F) are substituted for $i_1$ and $i_2$ of equation (C):

$$\frac{E_1 - E_D}{R_D} \geq \frac{E_2 + E_D}{R_s} \quad \text{(G)}$$

$E_D$ is given by the equation (G) as:

$$E_D \leq \frac{E_1 R_s - E_2 R_D}{R_s + R_D} \doteq E_1 \times \frac{R_s}{R_D} - E_2$$

$$\doteq -E_2 \quad \text{(H)}$$

$$(\because R_D \gg R_s)$$

Accordingly, in the second operating state, the reverse bias which is equal to the voltage $E_2$ of the second direct current power source 92 acts upon the diode 22, and it is apparent that the diode 22 is cut-off.

The voltage across the working gap 14 may also be obtained for the second operating state. This voltage is equal to $i_1 R_D$, and from the equation (E), the following formula is obtained:

$$i_1 R_D \doteq \frac{E_1 - E_D}{R_D} \times R_D = E_1 - E_D$$

$$\doteq E_1 + E_2 \quad \text{(I)}$$

$$(E_D \doteq -E_2)$$

Accordingly, in the second operating state, the voltage across the working gap 14 is almost equal to the sum of voltages $E_1$ and $E_2$.

In practice, the shift from the first operating state to the second operating state is extremely fast, and thus the existence of the first operating state may be disregarded, although it does exist in theory. Therefore, the pulse voltage Vo in the sub-period $t_a$ may be represented during the entire sub-period $t_a$ as follows:

$$Vo \doteq E_1 + E_2 \quad \text{(J)}$$

In prior art devices, which do not use an auxiliary circuit 90, the pulse voltage Vo during the period $t_a$ is merely equal to $E_1$. In contrast, using the present invention, a high voltage which is almost equal to $E_1 + E_2$ can be impressed across working gap 14. This increased no-load voltage Vo permits enlargement of the working gap 14. It will be understood that one of the factors which decides the dielectric strength of the working gap 14 is the size of the gap. Thus, if the gap size is increased, the dielectric strength of the gap is also increased. However, the increased no-load voltage of the instant invention makes it possible to generate sufficient potential across the widened gap to permit a discharge through the dielectric material. The increased width of the working gap is effective to prevent short-circuiting of the working gap due to ionization in the gap, or an accumulation in the gap of waste material created by the etching operation.

Naturally, stoppage of the etching operation due to such causes is undesirable since it greatly reduces the efficiency of the operation.

The period $t_b$ will now be discussed in detail. In this period, the voltage appearing across the working gap 14 is nearly equal to Va as shown in FIG. 2.

The voltage Va is based on the arc in working gap 14, and is usually referred to as the arc voltage. This voltage Va is relatively low compared to the no-load voltage Vo, and is usually between 20 and 25 (V). During the period $t_b$, the apparatus shown in FIG. 1 is in its third operating state. The key feature of the third operating state is that the voltage appearing across the working gap 14 is low compared to the no-load voltage Vo. The third operating state may be theoretically described as follows.

First, the following equation is obtained:

$$i_1 \times R/N = E_1 - E_D - Va \quad \text{(K)}$$

Another equation in $E_D$ may be obtained by solving equation (C) above:

$$E_D = i_2 R_s - E \quad \text{(L)}$$

Supposing that the diode 22 is switched off by receiving a reverse bias in sub-period $t_b$ following sub-period $t_a$, then $i_1 = i_2$ and when $i_2$ of the equation (L) is substituted for $i_1$ of the equation (K):

$$E_D = \frac{E_1 - E_D - Va}{R_N + R_s} \times R_s - E_2$$

If equation (H) is inserted into this equation, and R/N is omitted because it is small:

$$E_D \doteq E_1 + E_2 - Va - E_2 = E_1 - Va \quad \text{(M)}$$

In this state of the apparatus, the voltage $E_1$ is larger than the voltage Va, and this $E_D$ is positive.

Thus, even if the second direct current power source 92 applies a reverse bias to diode 22, the diode will be conductive because a net forward bias is applied to it.

When diode 22 is in its conductive state, a voltage almost equal to Va appears between nodes a and b. This voltage is divided by the resistors 82 and 84. As stated above, the voltage Va is lower than the voltage $V_1$. Accordingly, the voltage $Eab_3$, which is applied between nodes a and b in the third operating state, is lower than the voltage $Eab_1$ applied between the nodes a and b in the first operating state.

In the above-described embodiment of the invention, the resistance of the resistors 82 and 84 is selected so that the divided voltage $Eab_3$ across resistor 84 is lower than the sum of the zener voltage of zener diode 98 and forward voltage drop between the base and the emitter of transistor 100. As the result, base current is not supplied to the transistor 100 in the third operating state, and the transistor 100 is therefore switched off. Thus, in the third operating state, the current $i_2$ is zero because the diode 22 is conductive and transistor 100 becomes open-circuited. Therefore, the discharge current flowing through the working gap is equal to the current $i_1$. This current flows through only the main circuit 70 which includes diode 22, resistor apparatus 40, the first switching means 30, and the first direct current power source 16. This current $i_1$ is given by the equation (K):

$$i_1 = \frac{E_1 - E_D - Va}{\frac{R}{N}} \doteq N \times \frac{E_1 - Va}{R}$$

$$(\because E_D = 0) \quad \text{(N)}$$

This current does not flow through the transistor 100, although it does flow through transistors 31, 32 - - - - (3N) connected in parallel. This discharge current influences the etching efficiency, and in addition, the etching speed can be increased by increasing the discharge current. The discharge current can be increased by increasing the number (N) of transistor in the first switching means 30.

In the third operating state, it is possible to have the transistor 100 biased to its conductive state. This can be attained by setting up the resistance of resistors 82 and 84 so that the voltage across resistor 84 in the third operating state may be greater than the sum of the zener voltage of the zener diode 98 and the forward voltage drop between the base and the emitter of transistor 100. In this situation, the no-load voltage Vo can be increased in the sub-period $t_a$.

In prior art devices, a danger arises in this situation since it is impossible to reliably switch transistor 100 before transistors 31, 32 - - - - (3N) have switched at the termination of period $t_b$. This can cause the entire voltage $E_1 + E_2$ to be applied across transistors 31, 32 - - - - (3N), resulting in destruction of all transistors. The same situation may occur in prior art devices where transistor 100 fails and remains in its conductive state all the time.

However, in the instant invention, a diode 102 protects transistors 31, 32 - - - - (3N) from such an overload. The diode 102 by-passes the voltage $E_2$, thus protecting transistors 31, 32 - - - - (3N). Diode 102 is connected to node $b$ at its anode, and to node $a$ at its cathode. Diode 102 does not inhibit the normal operation of the circuit because it is reverse biased against the voltage $Eab_1$ and $Eab_3$ applied between nodes $a$ and $b$ in the first and third operating states.

Figure 3:
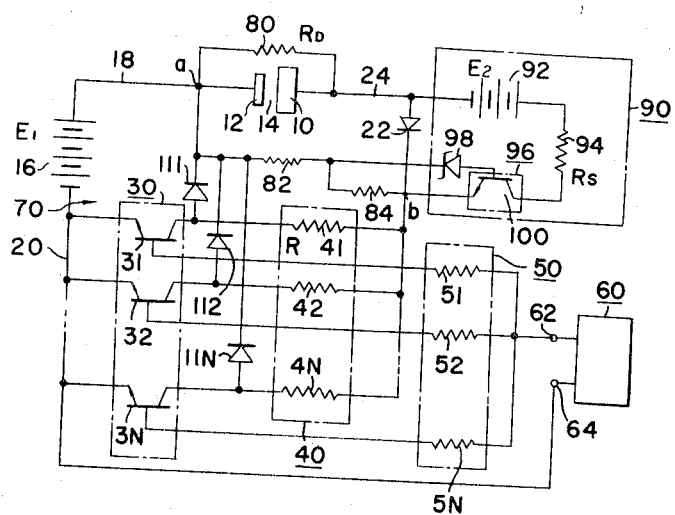
FIG. 3 is a schematic diagram of a circuit illustrating another embodiment of the present invention; and, FIG. 4 is a graphical diagram showing examples of etching data obtained using the present invention.

In FIG. 3, an alternative embodiment of the present invention is shown. In this embodiment, N number of diodes 111, 112 - - - - (11 N) which are the same in number as the transistors in the first switching apparatus 30 are provided in place of the diode 102 shown in FIG. 1. The anodes of each of the diodes 111, 112 - - - - (11N) are respectively connected to each of the collector electrodes of transistors 31, 32 - - - - (3N), and each of the cathodes of diodes 111, 112 - - - - (11N) are connected to the lead wire 18. These diodes 111, 112 - - - - (11n) protect the transistors 31, 32 - - - - (3N) from overloads in the same manner as the above described diode 102.

In the quiescent time $T_2$, both the transistors of the first switching means 30 and of the second switching means 96 are in their open state, and the voltages of the two direct current power sources 16 and 92 are respectively placed across these non-conductive transistors. In prior art devices in which a second switching element such as 96 is not provided, the total voltage of the power source in the apparatus is placed across each of the transistors of the first switching apparatus 30. In that situation, the maximum voltage of the power source is limited by the breakdown voltage of the transistors in the first switching means 30. It is apparent that in such devices, the voltage of the power source can be increased only if the breakdown voltage of switching means 30 is increased. However, it is not desirable to increase the breakdown voltage of switching means 30, since, for example, if switching elements having twice the breakdown voltage are used in constructing a switching means 30, such a switching means would usually cost more than two times the usual price, which would make it very costly. In addition, transistors having high breakdown voltages are generally inferior in frequency response, and are rather inefficient since their output currents are low, requiring the use of more transistors.

In the instant invention, the addition of the second switching element 96 allows an increase in the total voltage of the power source used in the apparatus without need for increasing the breakdown voltage of the first switching means 30, since the total voltage of the power sources used in the instant apparatus is partially placed across second switching element 96 and partially across first switching element 30.

Further, since the instant invention is designed not to permit a discharge current to flow through the second switching means 96, a switching element having a low output can be used as the second switching means 96. This is very efficient, and makes it possible to construct the second switching means 96 from a small number of switching elements. For example, the second switching means can be constructed using only one transistor as in the above described embodiment. The use of only a small number of switching elements reduces remarkably the overall cost of the apparatus as compared with the cost of increasing the breakdown voltage of all the transistors which constitute the first switching means 30. Of course, when the breakdown voltage of the second switching means 96 is high, it is possible to increase the total voltage of power source in the apparatus considerably, and to thereby improve the efficiency of the etching operation.

In each embodiment of the apparatus shown in FIGS. 1 and 2, the same effect can be attained if each of the transistors 31, 32 - - - - (3N) of the first switching means 30 is replaced by another type of switching element, such as a relay or a thyristor. It is easy to obtain thyristors having high current capacity as compared with transistors. Therefore, the number of switching elements can be reduced if thyristors are used, although a conventional turn-off circuit must be added to the respective thyristors. In both embodiments of the invention, another switching element, such as a relay or a thyristor, can also be used as the second switching means. When using thyristors, the thyristors are arranged so as to be "on" simultaneously with the first switching means 30, and "off" when the diode 22 is made conductive in the third operating state. The thyristor may also be arranged to switch "on" and "off" simultaneously with the operation of the first switching means 30. A zener diode 98 must be employed in parallel with a relay coil when a relay is used in place of the transistor 100.

Referring now to the apparatus shown in FIGS. 1 and 3, two practical examples showing numerical values of the voltages $E_1$, $E_2$, $E_D$, the resistance $R_D$, $R_s$, R, the resistance $R_{B1}$ of resistor 82, the resistance $R_{B2}$ of resistor 84, the zener voltage $V_2$ of zener diode 98, and number of transistors N of the first switching means 30 will now be given. These numerical values for each of the elements are only examples and can be changed at will within the the teachings of the instant invention. Also, it will be noted that these examples may be applied to both the embodiments of FIG. 1 and FIG. 2.

EXAMPLE I $E_1 = 80$ (V), $E_2 = 250$ (V), $E_D \doteqdot 1$ (V)
$R_D = 1,000$ ($\Omega$), $R_s = 200$ ($\Omega$), $R = 80$ ($\Omega$)
$R_{B1} = 800$ ($\Omega$), $R_{B2} = 3,200$ ($\Omega$), $V_2 = 24$ (V)
$N = 20$

Figure 4:
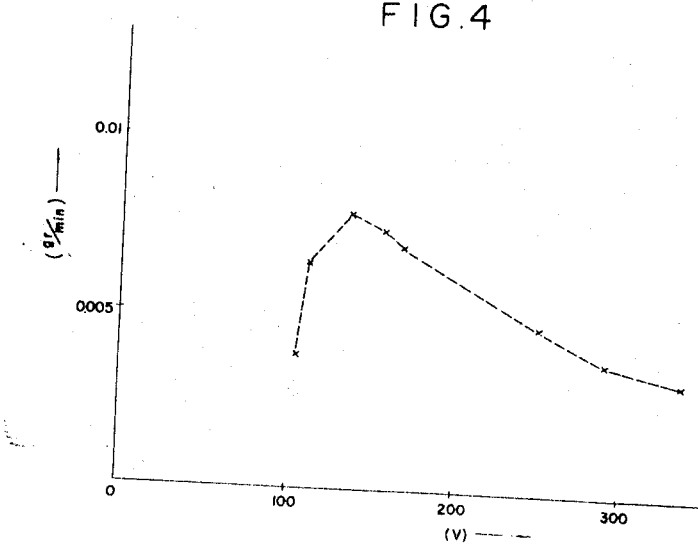

EXAMPLE II $E_1 = 40$ (V), $E_2 = 95$ (V), $E_D \doteqdot 1$ (V)
$R_D = 500$ ($\Omega$), $R_s = 100$ ($\Omega$), $R = 20$ ($\Omega$)
$R_{B1} = 800$ ($\Omega$), $R_{B2} = 3,200$ ($\Omega$), $V_2 = 24$ (V)
$N = 5$ In Example (II), the etching speed, when changing the voltage $E_2$ within the range of 50– 320 (V) has been measured and is shown in FIG. 4. The horizontal axis in FIG. 4 shows voltage V applied across the working gap 14, and the longitudinal axis shows the etching speed in gr./min. These data were obtained using copper as a workpiece 10, and a round bar made of copper having a circumference of 20 mm. as the working electrode 12. According to FIG. 4, it is apparent that the maximum etching speed is obtained when the voltage applied to the working gap 14 is about 135 V, and that this impressed voltage is most efficient in an electrolytic etching operation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A circuit for an electroerosive etching apparatus comprising:
   main circuit means, said main circuit means including
      first power source means,
      first switching means coupled to said first power source means,
      first diode means coupled in series with said first switching means,
      electrode means, and, said first power source means and said first switch means adapted to be coupled to a workpiece, said electrode means arranged to be separated from said workpiece by a working gap, auxiliary circuit means coupled to said main circuit means, said auxiliary circuit means including second power source means, and, second switching means coupled to said second power source means, said intercoupled second power source means and second switch means coupled in parallel with said first diode means, whereby said combined main and auxiliary circuits are automatically responsive to conditions existing at said working gap such that when said first switch means is in its conductive state, said second switch means is in its conductive state until a current flows in said working gap but when a current flows in said gap said second switch means switches to its non-conductive state.

2. A circuit as in claim 1, wherein:

said first and second power source means are coupled in series across said working gap when said first and second switch means are in their conductive states.

3. A circuit as in claim 1, wherein:

means are provided in said main circuit means for protecting said first switching means against overloads.

4. A circuit as in claim 3, wherein:

said protecting means comprises a diode.

5. A circuit as in claim 1, wherein:

said first switching means includes a plurality of transistors, and a pulse source coupled to said transistors for switching said transistors between their conductive and non-conductive states.

6. A circuit as in claim 1, wherein:

said second switching means switches in response to the magnitude of the voltage across said working gap.

7. A circuit as in claim 6, wherein:

said second switching means includes a transistor, and a zener diode, said zener diode coupled between said transistor and said working gap for sensing the magnitude of the voltage across said working gap.

8. A circuit as in claim 1, wherein said first power source means has a first output voltage and said second power source means has a second output voltage, and said second output voltage is larger than said first output voltage.

* * * * *